Oct. 30, 1951  D. L. BACON ET AL  2,572,969
SHOCK MOUNT
Filed Sept. 22, 1948  2 SHEETS—SHEET 1
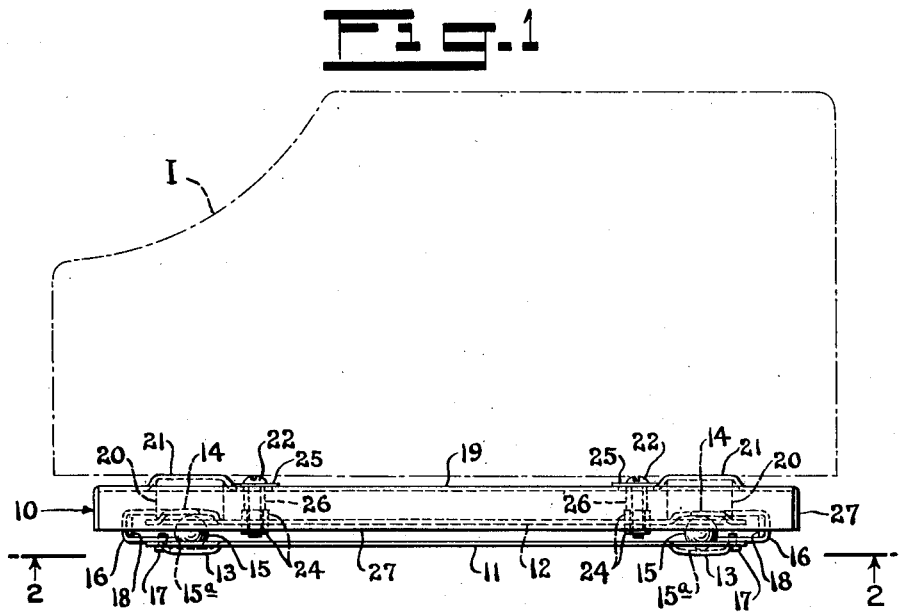
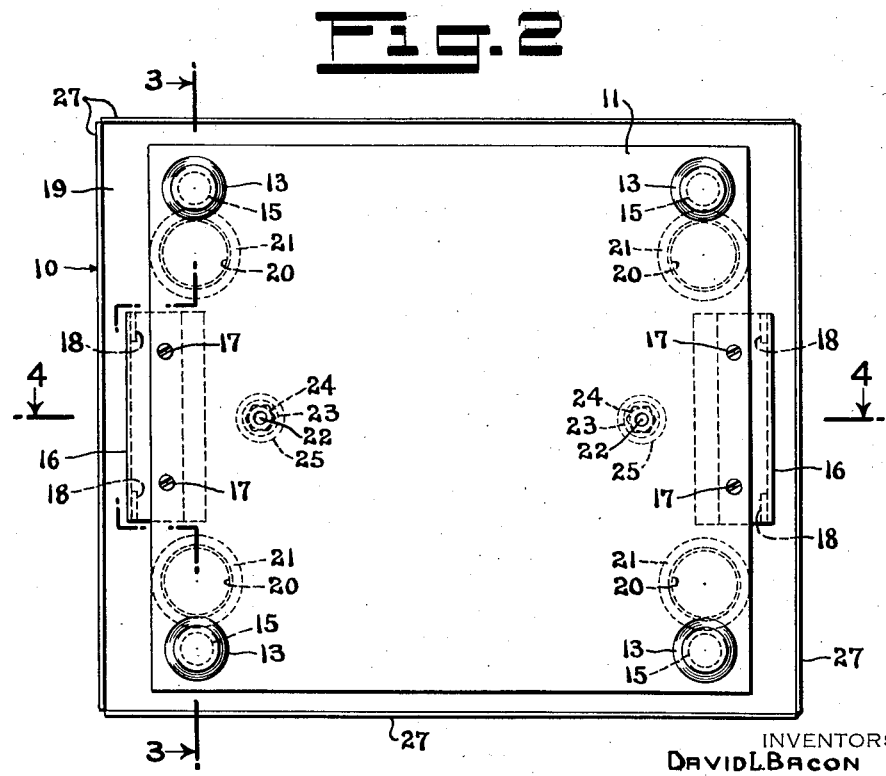
INVENTORS
DAVID L. BACON
JAMES E. McLOUGHLIN
BY
H. G. Manning
ATTORNEY Oct. 30, 1951 D. L. BACON ET AL 2,572,969
SHOCK MOUNT
Filed Sept. 22, 1948 2 SHEETS—SHEET 2
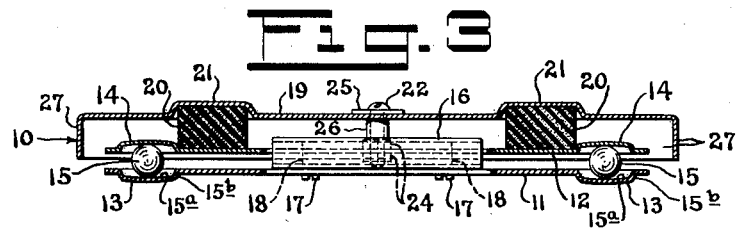
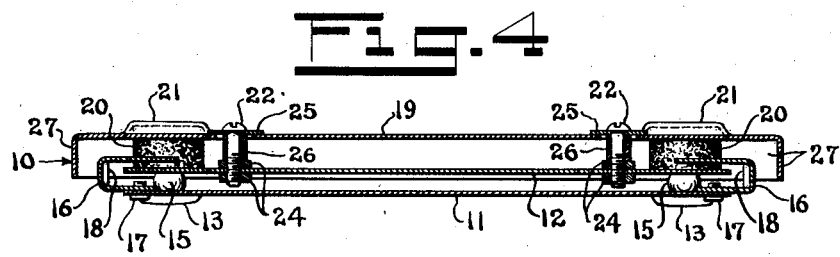
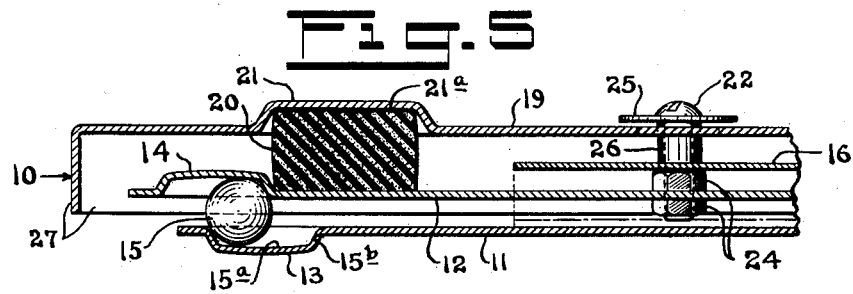
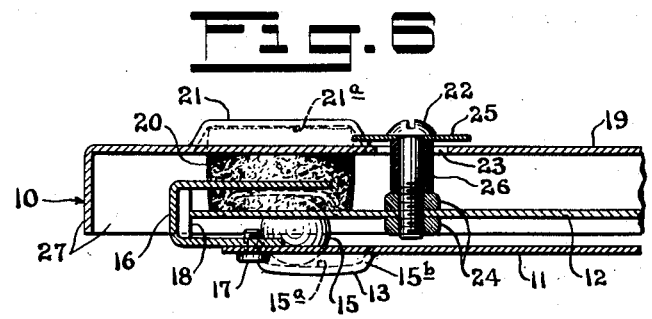
INVENTORS
DAVID L. BACON
JAMES E. McLOUGHLIN
BY
H. G. Manning
ATTORNEY Patented Oct. 30, 1951

2,572,969

UNITED STATES PATENT OFFICE 2,572,969

SHOCK MOUNT

David L. Bacon, North Haven, and James E. McLoughlin, New Haven, Conn., assignors to The Soundscriber Corporation, New Haven, Conn., a corporation of Connecticut Application September 22, 1948, Serial No. 50,618

2 Claims. (Cl. 248—22)

This invention relates to shock absorbing supports, and more particularly to a shock mount for dictating machines and other instruments of a sensitive or vibratory nature.

One object of this invention is to provide a device of the above nature which will effectively prevent shocks from being transmitted in any direction from the surface upon which the mount is supported to an instrument on said mount, or conversely from a vibratory instrument to a supporting surface.

Another object is to provide a device of the above nature having shock absorbing elements which are so arranged as to permit a very compact construction, whereby said mount will occupy little space, and will be inconspicuous.

A further object is to provide a device of the above nature which will be simple in construction, inexpensive to manufacture, easy to install and manipulate, ornamental in appearance, and very efficient and durable in use.

With these and other objects in view, there has been illustrated on the accompanying drawing one form in which the invention may conveniently be embodied in practice.

In the drawings,

Fig. 1 is a side elevation of the improved shock mount, showing an instrument thereon in broken lines.

Fig. 2 is a bottom view of the mount, taken on the line 2—2 of Fig. 1.

Fig. 3 is a cross-sectional view of the same, taken on the line 3—3 of Fig. 2, showing the parts in a neutral and unloaded condition.

Fig. 4 is a cross-sectional view of the same, taken on the line 4—4 of Fig. 2.

Fig. 5 is a cross sectional view on an enlarged scale of a portion of the shock mount, showing the parts in the position they would assume when loaded and showing the action of the balls in absorbing lateral shocks.

Fig. 6 is a cross-sectional view similar to a portion of Fig. 4, on an enlarged scale, but showing the mount in a loaded and laterally displaced condition.

Referring now to the drawings, in which like reference numerals denote corresponding parts throughout the several views, the numeral 10 indicates generally the improved shock mount, and the letter I indicates an instrument thereon. The mount 10 comprises a rectangular lower plate 11 and a rectangular inner plate 12, each of which is provided respectively with a plurality of circular recesses 13, 14 formed by embossing the plate material adjacent the respective corners of the plates.

The plates 11, 12 may be of identical form, but will be reversed in position so that the recesses 13, 14 are adapted to confine a plurality of balls 15 of any suitable material, such as steel, glass, or rubber. It will be noted that the plates 11, 12 are flat excepting in the area of the recesses 13, 14, whereby said plates will have a small degree of inherent flexibility. This flexibility will permit the recesses 13, 14 and the balls 15 to be held always in firm engagement by the load imposed upon the shock mount, thus contributing to the stability of the mount and avoiding looseness or play therein in the event that the surface supporting the mount is not perfectly flat, or if one of the balls 15 should be slightly displaced or out of phase with the other balls.

In order to render the balls 15 self-centering when in use, the recesses 13, 14 are each provided with an inner surface 15a which is spherical in curvature, and is formed on a radius greater than the radius of the balls 15. A steep peripheral wall 15b is formed in angular relation to each of the curved surfaces 15a, thus positively limiting the movement of the balls 15.

It has been found desirable in practice to form the inner surfaces 15a on a vertical radius which is approximately six times the diameter of the balls 15, while the horizontal diameter of the recesses 13, 14 will be approximately one and one-half times the diameter of the balls 15.

The surfaces 15a may, if desired, be formed on an elliptical curvature, whereby the shock mount may be made very sensitive in one horizontal direction, while resisting displacement more firmly in another horizontal direction.

In order to prevent excessive separation of the plates 11, 12 during handling, and consequent loss of the balls 15, provision is made of a pair of end brackets 16 which are U-shaped in cross section and are secured by screws 17 to central portions of opposite ends of the lower plate 11 in such a position as to extend in spaced relation over the end edges of the inner plate 12.

The end brackets 16 will thus permit free action of the ball bearings 15. Said brackets are provided, however, with resilient bumper pads 18 on their inner surfaces in order to cushion impact by the inner plate 12 in the event that an excessive lateral shock should be applied to the mount.

A rectangular top plate 19, which is somewhat larger than the inner plate 12, is supported upon said inner plate by means of a plurality of sponge rubber pads 20, which rest upon the inner plate in inwardly offset relation to the respective ball recesses 14. The top plate 19 is provided with upwardly struck bosses 21 which serve as seats for the sponge rubber pads 20, and in which said pads are preferably secured by means of cement 21a.

The top plate 19 is held in assembled relation to the inner plate 12 by means of a pair of headed retainer screws 22 disposed in enlarged apertures 23 (Fig. 6), in the top plate 19 and firmly secured in apertures in the inner plate 12 by pairs of nuts 24. The retainer screws 22 are also provided with washers 25 which will prevent the heads of said screws from passing through the apertures 23, and rubber sleeves 26 which will serve as cushions in the event that the edges of the apertures 23 should be shifted laterally against said screws.

By means of this construction, the weight of an instrument resting upon the top plate 19 will be resiliently supported by the sponge rubber pads 20, and the retainer screws 22 will not interfere with the resilient action of said pads.

The material and the proportions of the pads 20 will preferably be such that said pads will have at least one-half of their uncompressed thickness when supporting the normal load which the top plate 19 is intended to carry, whereby said pads will function efficiently to absorb vertical shocks.

The top plate 19 is provided with a depending peripheral flange 27 which will protect the bearings 15 against dust and will conceal the parts below the top plate 19.

Operation

In operation, the shock mount 10 will be found useful to support a dictating machine or other sensitive instrument upon any suitable horizontal surface such as a desk. If desired, the mount 10 may be built into the instrument so as to be a part thereof. The bosses formed by the recesses 13 in the lower plate 11 will, of course, serve as feet for supporting the mount.

The shock mount 10 will protect the instrument I mounted thereon against substantially any shock which would normally be transmitted thereto by the supporting surface. Any sudden horizontal shock imparted to the lower plate 11, will result merely in rolling of the balls 15 in the recesses 13, 14, so that the inner plate 12 and the top plate 19 will be permitted to remain relatively stationary, and the instrument I will be protected against horizontal impulses. The large radius of curvature of the recesses 13, 14 will provide the shock mount with a natural period of horizontal oscillation which is much longer than the period of any horizontal vibration that would ordinarily be encountered in a stationary building.

Any vertical shocks imparted to the lower plate 11 by the supporting surface will, of course, be absorbed by the resilient pads 20, thereby substantially eliminating sudden vertical movement of the instrument I.

One advantage of the improved shock mount herein disclosed is that it is very compact and inconspicuous.

While there has been disclosed in this specification one form in which the invention may be embodied in practice, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a shock mount, a pair of plates, devices between said plates for supporting one of said plates upon the other for substantially free lateral movement of limited extent, and means for retaining said plates in loosely assembled relation, said retaining means comprising a pair of U-shaped end brackets secured respectively to opposite ends of one of said plates and extending in spaced relation around the end of the other of said plates, whereby said end brackets will not interfere with free action of said supporting devices.

2. In a shock mount, a bottom plate, an inner plate, balls between outer portions of said bottom plate and said inner plate for supporting the latter for free lateral movement of limited extent, said balls being confined by recesses in one of said lower and inner plates, said recesses having inner surfaces which are curved on a radius greater than the radii of the balls, a top plate resiliently carried upon said inner plate, and means comprising a pair of retainer screws secured in said inner plate and extending outwardly through enlarged apertures in said top plate for retaining said inner and top plates in loosely assembled relation, said bottom plate and said inner plate each having a flexible central portion, whereby a load on said top plate will hold said bottom and said inner plates in firm engagement with said balls despite small irregularities in the surface supporting said shock mount or in the position of said balls.

DAVID L. BACON.
JAMES E. McLOUGHLIN.

REFERENCES CITED

The following references are of record in the file of this patent:

UNITED STATES PATENTS

| Number | Name | Date |
|---|---|---|
| 2,414,506 | Bowen | Jan. 21, 1947 |
| 2,437,206 | Naher | Mar. 2, 1948 |
| 2,441,509 | Robinson | May 11, 1948 |